(12) United States Patent
Hiestand

(10) Patent No.: US 10,307,836 B2
(45) Date of Patent: Jun. 4, 2019

(54) CLAMPING DEVICE

(71) Applicant: MTH GbR Markus und Thomas Hiestand, Pfullendorf (DE)

(72) Inventor: Karl Hiestand, Pfullendorf (DE)

(73) Assignee: MTH GbR Markus und Thomas Hiestand, Pfullendorf (DE)

(*) Notice: Subject to any disclaimer, the term of this patent is extended or adjusted under 35 U.S.C. 154(b) by 74 days.

(21) Appl. No.: 15/364,660

(22) Filed: Nov. 30, 2016

(65) Prior Publication Data
US 2017/0151613 A1 Jun. 1, 2017

(30) Foreign Application Priority Data
Dec. 1, 2015 (EP) .................................... 15197275

(51) Int. Cl.
B23B 31/28 (2006.01)
B23B 31/26 (2006.01)
B23B 31/175 (2006.01)

(52) U.S. Cl.
CPC ........ B23B 31/26 (2013.01); B23B 31/16229 (2013.01); B23B 31/28 (2013.01);
(Continued)

(58) Field of Classification Search
CPC .............. B23B 31/16229; B23B 31/28; B23B 2231/26; B23B 2260/002; B23B 2260/128; B23B 2260/136
See application file for complete search history.

(56) References Cited

U.S. PATENT DOCUMENTS 8,752,281 B2 * 6/2014 Hangleiter .............. B23B 31/28
279/135

FOREIGN PATENT DOCUMENTS

DE 102011108002 1/2013
EP 2384839 11/2011
(Continued)

Primary Examiner — Daniel W Howell
Assistant Examiner — Paul M Janeski
(74) Attorney, Agent, or Firm — Pandiscio & Pandiscio

(57) ABSTRACT

In a clamping device (1) for machine tools (2) that is equipped with a power-operated chuck (5) and an electric drive motor (11) with a changeover function for triggering clamping movements, a motion converter (31) as well as a force accumulator (51) for maintaining the clamping force, which comprises several spring packs (52) supported on an adjustment element (32) of the motion converter (31), the spring packs (52) are each only arranged on one side of the adjustment element (32). In addition, a pressure piece (53) interacting with the adjustment element (32) is firmly connected to several spacer elements (57), each of which carries a stop disc (61) and passes through the spring packs (52) as well as a spacer (66). The spacer elements (57) and the spacers (66) can be adjusted relative to one another and the spacers (66) interact with spacer pins (71) which are guided through the pressure piece (53) and are supported on the wall (24) of the housing (21) opposite to the spring packs (52). Due to this embodiment, the spring packs (52) are always preloaded and do not have any axial play, and the adjustment movements of the pressure piece can thus be registered and evaluated directly. Rather, the spring packs (52) have a defined preload at all times, with the effect that the operating method is improved compared to embodiments of prior art.

14 Claims, 6 Drawing Sheets

(52) U.S. Cl.
CPC ..... *B23B 2231/26* (2013.01); *B23B 2260/002* (2013.01); *B23B 2260/128* (2013.01); *B23B 2260/136* (2013.01)

(56) References Cited

FOREIGN PATENT DOCUMENTS

| | | |
|---|---|---|
| EP | 2548681 | 1/2013 |
| EP | 2913130 | 9/2015 |
| EP | 3040144 | 7/2016 |

\* cited by examiner

CLAMPING DEVICE

REFERENCE TO PENDING PRIOR PATENT APPLICATION

This patent application claims benefit of European Patent Application No. 15 197 275.9, filed Dec. 1, 2015, which patent application is hereby incorporated herein by reference.

FIELD OF THE INVENTION

The present invention relates to a clamping device, especially for machine tools, that are for example equipped with a power-operated chuck for holding a workpiece and the clamping jaws of which can be adjusted using the clamping device by means of an axially moveable draw rod as the actuating element, in which the clamping device, arranged in a housing, possesses an electric drive motor with a change-over function for triggering clamping movements, a motion converter for converting the adjustment movements of the rotor shaft of the drive motor into the axial adjustment movements of the draw rod required for actuating the clamping jaws as well as a force accumulator for maintaining the clamping force, which comprises several pre-stressed spring packs arranged around the circumference supported on an adjustment element of the motion converter that is configured as a hollow shaft and is provided with a projection projecting radially outward.

BACKGROUND OF THE INVENTION

A clamping device of this kind is disclosed in EP 15 150 064. In order to undertake both internal and external clamping by means of the power-operated chuck, in this embodiment several spring packs forming the force accumulator are arranged evenly around the circumference on both sides of pressure pieces acting on the adjustment element of the motion converter. In this case, although the springs are guided on pins screwed into the housing and are alternately clamped by the axial movement of the pressure piece, a defined preload of the springs that are not involved in the particular clamping procedure is not provided. Instead, these springs have the force removed from them and are held with axial play in holes worked in the pressure piece, which as a result of the holes having a diameter larger than the springs, are not suitable for guidance purposes.

Apart from the fact that this means two force accumulators with a large number of spring packs are required for both clamping directions, the axial play on the force accumulator which is not loaded means that when the clamping direction is reversed there is the requirement for this clearance to be crossed before any clamping force can be established. The adjustment range to be specified for the motion converter must consequently be made relatively large, and also it is necessary to cover a dead travel before clamping force is established. Despite the significant constructional complexity, this means that a satisfactory operating method is not provided. Furthermore, it is a disadvantage that a defined middle position of the pressure piece cannot be achieved because during a clamping procedure, a signal is only available and able to be evaluated once an adjustment movement of the pressure piece to which a signal ring is attached takes place.

SUMMARY OF THE INVENTION

The task of the present invention is therefore to create a force accumulator which does not have any axial play in the spring packs and thus permits the middle position of the pressure piece to be ascertained precisely. The adjustment movement of the pressure piece and thus the clamping force should be able to be established without play as a result. At the same time, it should be guaranteed that a defined preload on the spring packs is provided at all times, thereby allowing short spring travel distances in order for the clamping force to be established. Furthermore, the springs of the force accumulator should always be guided to an adequate extent and their spring travel should be able to be limited according to the working procedures. The operating method of the clamping device should thus be significantly improved compared to the embodiment of prior art.

In accordance with the present invention, this is achieved in a clamping device of the aforementioned type in that for internal and external clamping of a workpiece, each of the spring packs of the force accumulator is inserted on one side of the adjustment element of the motion converter between the housing and a pressure piece, that several spacer elements are firmly connected to the pressure piece, each of which carries a stop disc and passes through the spring packs as well as a spacer, that the spacer elements and the spacer can be adjusted relative to one another and that the spacer interacts with spacer pins in an axial direction, in which case these spacer pins pass through the pressure piece and are supported against the wall of the housing opposite to the spring packs.

In a clamping device in which spring packs are arranged on both sides of the adjustment element of the motion converter, the aforementioned task is accomplished in that each of the spring packs is inserted between a pressure piece and stop discs in a mirror-image arrangement, that the stop discs are held by spacer elements attached to the pressure piece in such a way as to allow for limited movement and that stops are arranged on the stop discs on the housing and the pressure piece.

It is advantageous in both embodiments for the spacer elements to be configured as offset pins which have one end screwed into the pressure piece and are in contact with this by means of a collar, and for the free ends of the spacer elements to be configured as a screw head with a contact surface provided on the inside for the stop discs. The spacer elements can, however, also each be configured as an intermediate piece provided with a collar in contact with the pressure piece, and with one end screwed into the pressure piece, in which case a screw as the stop for the stop discs is inserted on the free end of the intermediate piece and the collar and/or the connecting part of the spacer elements is/are configured as a guide for the spring packs and/or the stop discs.

It is highly advantageous if the pressure piece, the spacer elements with stop discs and springs as well as the spacer and the spacer pins inserted in the pressure piece or the pressure piece and the spacer elements with stop discs and springs form a structural unit that can be preassembled and clamped into the housing without play.

The spacer should be configured with an angled or T-piece cross section, with its outer leg guided on the inner wall of the housing in such a way as to be movable, and with the springs of the force accumulator supported against the leg which holds the spacer elements.

The stop discs in both embodiments can each be configured in the form of a hollow shaft with a T-shaped cross section, the tube-shaped inner part of which accommodates a spacer element and is provided on the outside with a stop for the spacer element and on the inside with a contact surface which interacts with the spacer or the pressure piece.

Moreover, it is appropriate for the distance between the stop of the tube-shaped part of the stop discs and the spacer or the pressure piece to be adjustable in the neutral position of the clamping device so that the maximum clamping force of the spring packs of the force accumulator can be adjusted and so the spacer can be guided in a movable arrangement with its radially projecting leg along the inner wall of the housing.

It is also advantageous for the spacer pins to be guided in the pressure piece in an adjustable manner, in which case the pressure piece is preferably configured in two parts, and for the spacer pins to be supported on the opposite side of the housing to the spring packs or for them to be attached to this and for the spacer elements carrying the stop discs to be screwed onto the pressure piece and equipped with a collar configured as a screw head on the outer end area, in which case the collar interacts with a contact surface provided or let into the stop disc.

The spring packs of the force accumulator can be formed by cup springs or coiled compression springs arranged on the stop discs, and the pressure piece which is configured in a preferred embodiment in two pieces should be supported on the shoulder of the adjustment element of the motion converter by means of anti-friction bearings.

Moreover, it is advantageous for a sensor to be attached to the pressure piece and/or draw rod, for example in the form of a signal ring, in order to determine the clamping force or the adjustment movements of the draw rod.

If a clamping device is configured in accordance with the present invention, it is possible in both embodiments for the preload of the spring packs to be set precisely and also for it to be maintained when the load is removed. This means the springs do not have any play when they are slackened, and are instead always kept under a selectable preload. This means that clamping force is established immediately following initiation of a clamping procedure in power-operated chucks, and that this clamping force can also be measured immediately by means of the pressure piece.

Furthermore, it is possible to use recesses provided on the spacer elements and on the stop discs as well as the housing and the pressure piece to restrict the spring travel of the springs and thus the clamping force, thereby reliably avoiding any overload. Moreover, the maximum clamping force of a spring accumulator can easily be selected and, under certain circumstances, also adjusted to different working procedures. As a result, the method of function of the clamping device is also significantly improved compared to the embodiment of prior art, with a straightforward structural design.

The components assigned to the force accumulator can be grouped together with it to make one structural unit which can be inserted pre-assembled and as a cartridge into the housing without play, so it is guaranteed that the spring packs of the force accumulator will not have any axial play in the non-loaded condition either, but will always be subject to preload. The force of the preloaded springs is not absorbed by the housing in this case, and because the pressure piece is returned to a middle position automatically after each clamping procedure, its adjustment movements can be registered without play and immediately evaluated in a corresponding manner by means of the machine controller.

BRIEF DESCRIPTION OF THE DRAWINGS

The drawing shows two sample embodiments of the clamping device configured in accordance with the present invention, the details of which are explained below. In the drawing.

DETAILED DESCRIPTION OF THE PREFERRED EMBODIMENTS

Figure 1:
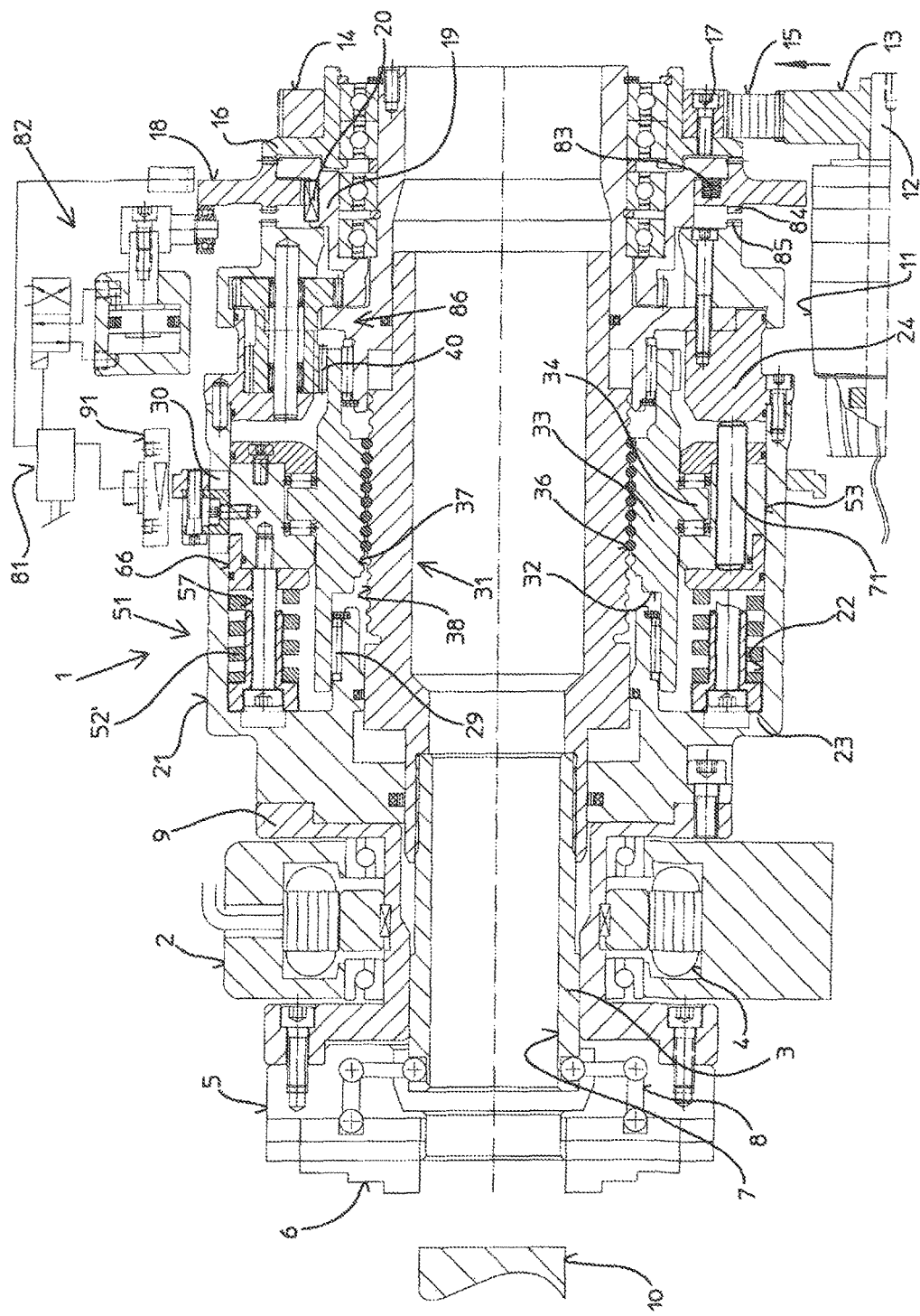
FIGS. 1 to 3 show the clamping device in an axial section, with a force accumulator arranged on one side of the motion converter, in different operating positions.

The clamping devices illustrated in FIGS. 1 to 3 and 5 and identified by 1 or 1' are used for actuating a power-operated chuck 5 arranged on a machine tool 2, by means of the radially adjustable clamping jaws 6 of which a workpiece 10 or 10' to be machined can be clamped in the power-operated chuck 5. The clamping jaws 6 of the power-operated chuck 5 in this case can be actuated via relay levers 8 by an axially adjustable, two-part draw rod 7, 7' that is in a driven connection with an electric drive motor 11 that has a changeover function by means of a motion converter 31. The rotational adjustment movements of the drive motor 11 are converted into axial adjustment movements of the draw rod 7, 7' by means of the motion converter 31. An electric motor 4 acts on the machine spindle 3 of the machine tool 2, by means of which the machine tool 2 can be driven. The clamping device 1 is attached to the machine spindle 3 by means of a flange 9.

In order to operate the power-operated check 5 by means of the clamping device 1, the clamping device 1 has the electric drive motor 11 arranged with its axis parallel to the clamping device 1 so that its rotor shaft 12 is in a driving connection with a belt pulley 14 by means of a belt pulley 13 attached to it and a toothed belt 15, in such a way that the belt pulley 14 can be connected to a gear unit 86 by means of a gear 16 attached to it using bolts 17 and a sliding sleeve 18, and the gear unit 86 is connected ahead of the clamping device 1.

The clamping device 1 largely consists of the motion converter 31 arranged in a housing 21 for converting the rotational adjustment movement of the rotor shaft 12 of the drive motor 11 into the axial adjustment movements of the draw rod 7 required for actuating the clamping jaws 6 of the power-operated chuck 5, and a force accumulator 51 for maintaining the clamping force when the drive motor 11 is stopped. The motion converter 31 which is supported on the housing 21 by anti-friction bearings 29 is formed by a recirculating ball spindle 35 in this case which consists of an adjustment element 32 configured with threaded grooves 37 in order to accommodate balls 36 as anti-friction bodies, and has the form of a hollow shaft 33 and counter-rotating grooves 38 worked into the draw rod 7. The adjustment element 32 is in a driving connection with a gear unit 86 by means of gearing 40, and the gear unit 86 is connected to an intermediate element 19 that can be linked to the bolt pulley 14.

Figure 2:
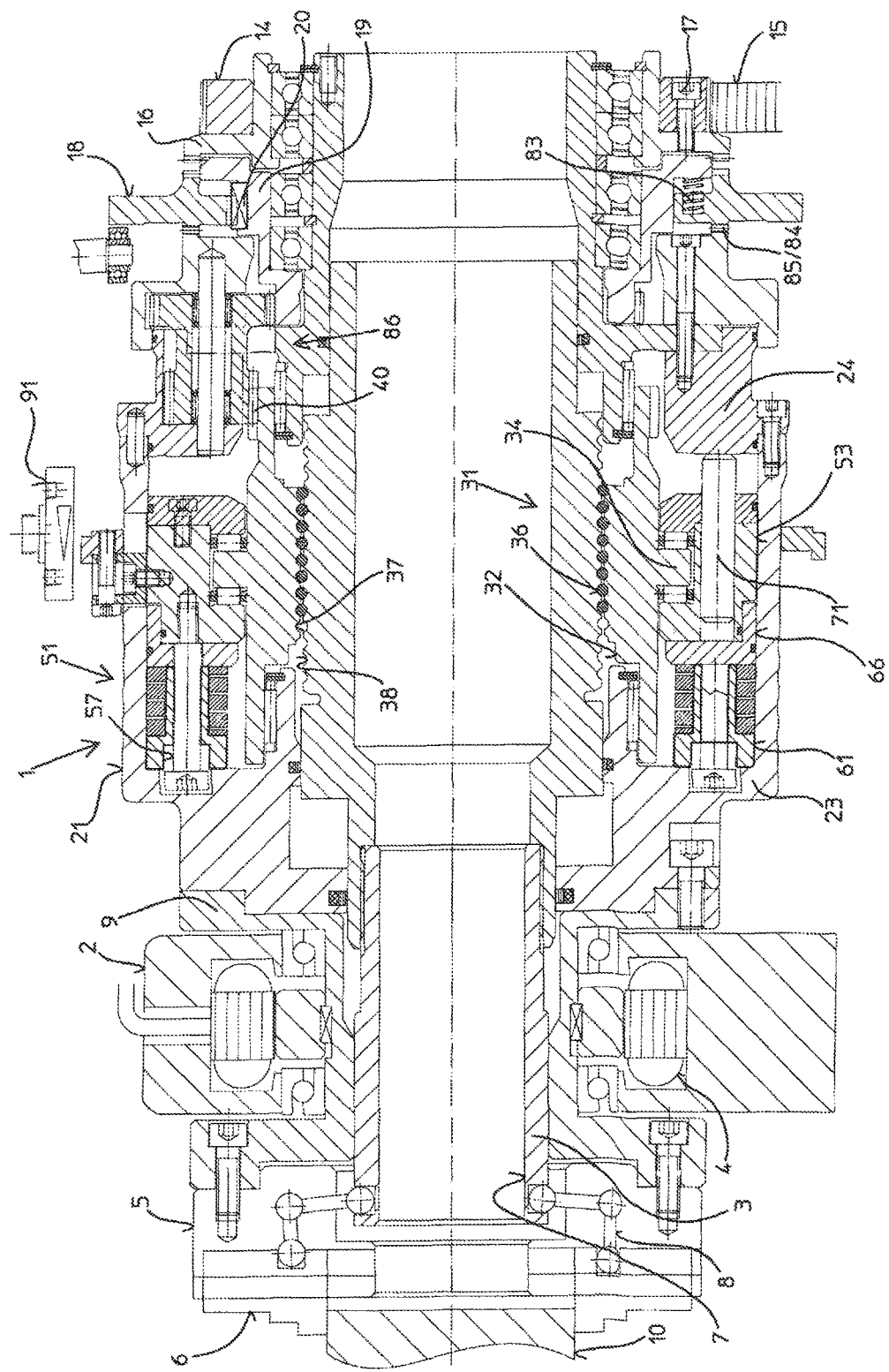
Figure 3:
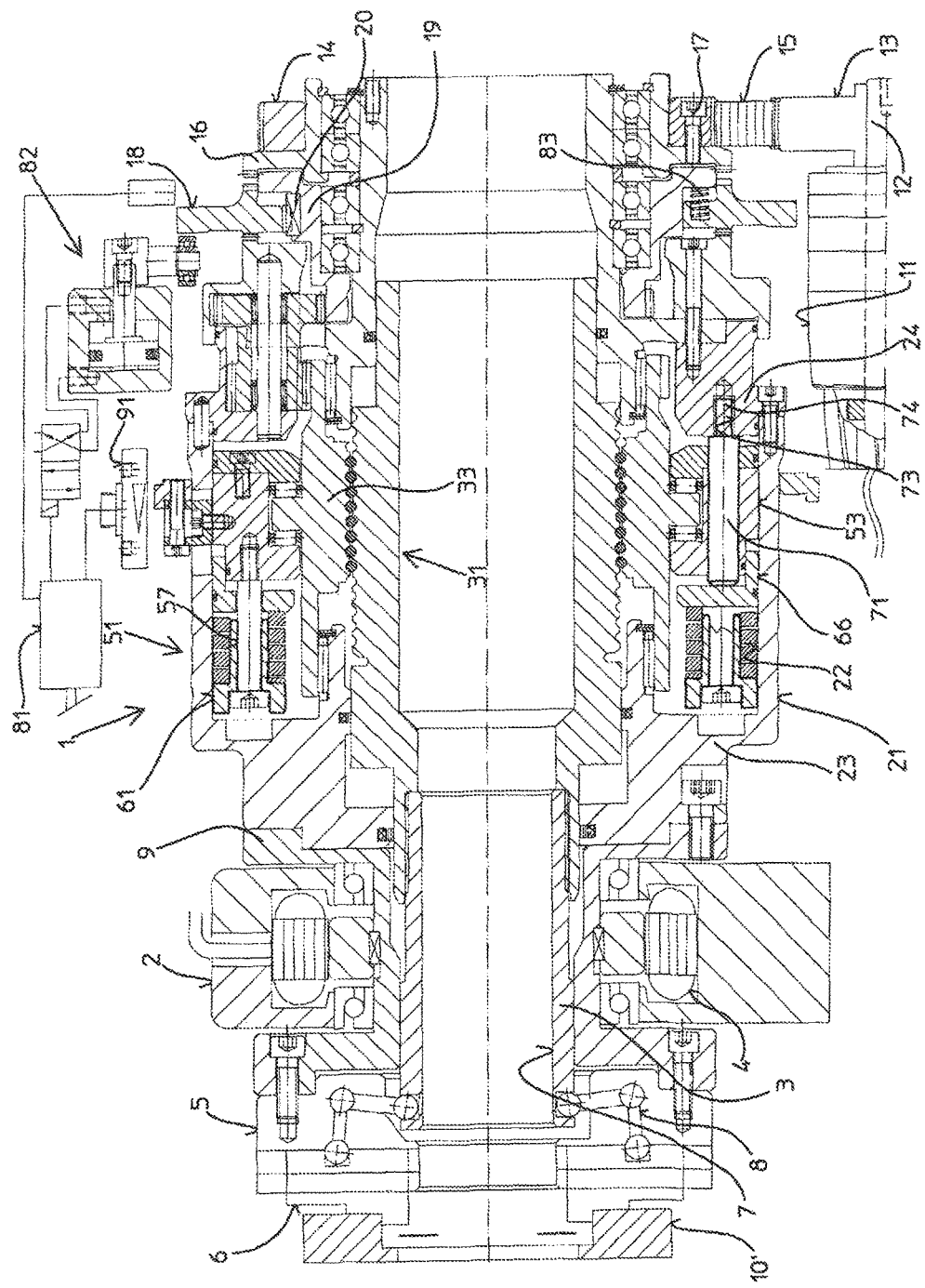
Figure 4:
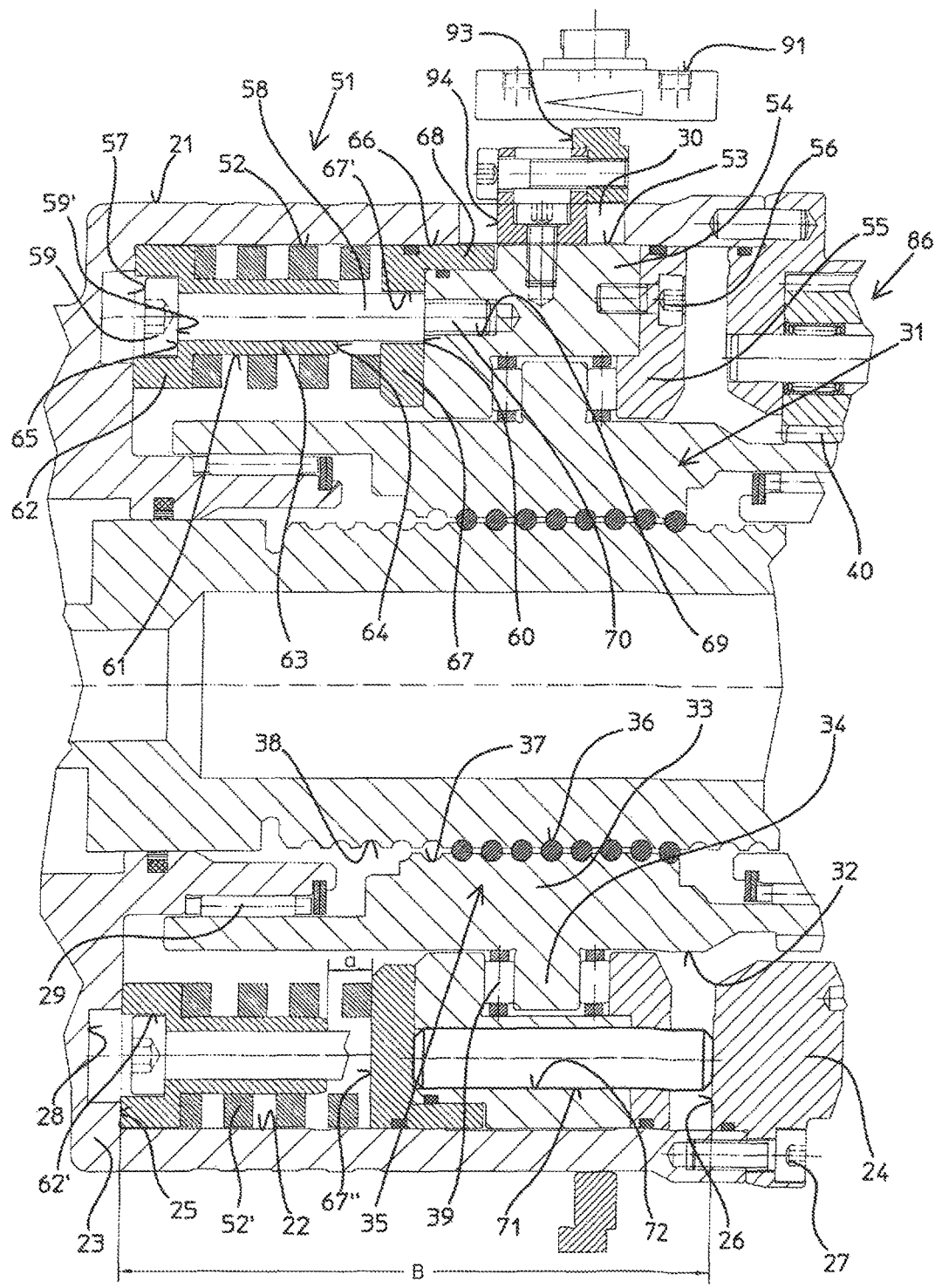
FIG. 4 shows a section from FIG. 1 in a magnified view.

The force accumulator 51 in the sample embodiment shown in FIGS. 1 to 4, and particularly in the magnified view in FIG. 4, is formed by several spring packs 52 arranged evenly around the circumference comprising coiled compression springs 52', each of which is inserted between stop discs 61 and a spacer 66. The stop discs 61 in this case can be moved to a limited extent on spacer elements 57 which are screwed into a pressure piece 53. Anti-friction bearings 39 support the pressure piece 53 on a shoulder 34 formed on the adjustment element 32, with the effect that adjustment movements of the adjustment element 32 are transmitted directly to the pressure piece 53. In addition, contact surfaces 59' are provided on the heads 59 of the spacer elements 57, and the stop discs 61 are supported on these contact surfaces 59'.

The stop discs 61 have a T-shaped cross section with the effect that their radially projecting leg 62 is guided so as to move on the inner wall 22 of the housing 21, and their tube-shaped parts 63 have the springs 52' arranged on them. On both ends, the stop discs 61 are equipped with contact surfaces 64 and 65 which interact firstly with the spacer 66 and secondly with a contact surface 25 provided on the end wall 23 of the housing 21. In addition, the legs 62 of the cylindrical holding stop discs 61 are provided with recesses 62' into which the spacer elements 57 engage with their heads 59 and which interact with the contact surface 65. In addition, contact surfaces 59' are provided on the heads 59 of the spacer elements 57 and have the stop discs 61 supported on them.

The spacer 66 has an angled cross section into the radially aligned web 67 of which holes 67' are worked for accommodating the spacer elements 57. The axially projecting leg 68 is, in contrast, in contact with the inner wall 22 of the housing 21 and is guided by it.

The spacer elements 57 are formed by pins 58 which are provided on one end with a head 59 for supporting on the stop discs 61 and at the other end with a screw thread 70 which are screwed into threaded holes 69 provided in the pressure piece 53. By means of a collar 60 formed by a shoulder, the spacer elements 57 are located in immovable contact with the two-part pressure piece 54 formed from a ring 54 and a disc 55 which are firmly connected to one another by means of screws 56.

A selectable distance a—indicated in FIG. 4—between the contact surface 64 of the stop discs 61 and the end face 67" of the web 67 of the spacer 66 means that the maximum clamping force of the coiled compression springs 52' of the spring packs 52 can be determined in advance. This is because as soon as the contact surfaces 64 make contact with the spacer 66, the coiled compression springs 52' and thus the spring accumulator 51 are blocked. In addition, it is possible to adapt the length of the distance a to the particular conditions by, for example, changing the tube-shaped parts 63 of the stop discs 61.

FIG. 1 shows the clamping device 1 in a neutral position, i.e. the drive motor 11 is connected to the motion converter 31 by means of the sliding sleeve 18 and the power-operated chuck 5 is opened so that the workpiece 10 can be placed in the chuck 5. The springs 52' of the spring packs 52 are preloaded with a predefined preload force between the stop discs 61 and the spacer 66.

When the workpiece 10 is inserted in the power-operated chuck 5 as shown in FIG. 2 and if energy continues to be supplied to the adjustment element 32 of the motion converter 31 by the drive motor 11 when the clamping jaws 6 are in contact with the workpiece 10, the balls 36 of the recirculating ball spindle 35 rotate in the grooves 38 of the locationally fixed draw rod 7 so that the adjustment element 32 of the motion converter is moved to the left. This causes the springs 52' of the spring packs 52 to be compressed until the tube-shaped parts 63 of the stop discs 61 make contact with the spacer 66. The heads of the spacer elements 57 engage in this operating status as shown in FIG. 3 in recesses 28 worked into the sidewall 23. The adjustment travel is limited in this case by the selected, specified distance a between the contact surfaces 64 and the spacer 66. When this operating status has been reached, the driving connection between the drive motor 11 and the motion converter 31 is interrupted.

This is achieved by means of a hydraulically or pneumatically operated servo device 82 acting on the sliding sleeve 18 as well as return springs 83. The servo device 82 is controlled for this purpose by a control unit 81 to which a sensor 91 is connected in order to determine the particular position of the pressure piece 53, in such a way that the sliding sleeve 18 is guided back to its starting position and is automatically moved to the left by means of the pressure springs 83 in such a way that the sliding sleeve 18 is released from the gear 18 and the other gearing 84 attached to the sliding sleeve 18 engages in the gearing 85 provided on the housing 21. Because the sliding sleeve 18 is mounted in a movable arrangement on gearing 20 attached to the intermediate piece 19, the clamping device 1 is blocked by means of the gear unit 86 such that the clamping force of the force accumulator 51 is maintained.

If, however, as shown in FIG. 3, a workpiece 10' should be clamped internally, the directions of movement must be reversed by means of the drive motor 11 with a switching function. However, in order for the force accumulator 51 to be able to be used effectively in such clamping procedures as well, and for tension to be built up in it, several spacer pins 71 are inserted in holes 72 in the pressure piece 53, in which case the spacer pins 71 interact with the right end wall 24 which is connected to the housing 21 by means of bolts 27. As soon as the spacer pins 71 are moved to the right by means of a corresponding adjustment movement initiated via the adjustment element 32 of the motion converter 31—which is implemented by means of the motion converter 31 when the draw rod 7 is stationary—and make contact with the end wall 24 which serves as a stop 26 for the spacer pins 71, the stop disc 61 is supported against the spacer pins 71 with the effect that the set, predefined clamping force of the force accumulator 51 is established. The stop discs 61 in turn are supported on the spacer 66, meaning that the force accumulator 51 arranged on only one side of the pressure piece 53 can be used both for external clamping and for internal clamping of a workpiece 10 or 10'.

However, as shown in FIG. 3, the spacer pins 71 can also be firmly connected to the housing 21 by means of a screw thread 74 which engages in threaded holes 73 worked into the end wall 24.

The servo device 91 by means of which the particular status of the pressure piece 53 is to be established is influenced by a signal ring 93 which is attached to the pressure piece 53 by means of a holder 94. For this purpose, slot-shaped recesses 30 are worked into the housing 21 and have the holders 94 carrying the signal ring 93 inserted in them.

Figure 5:
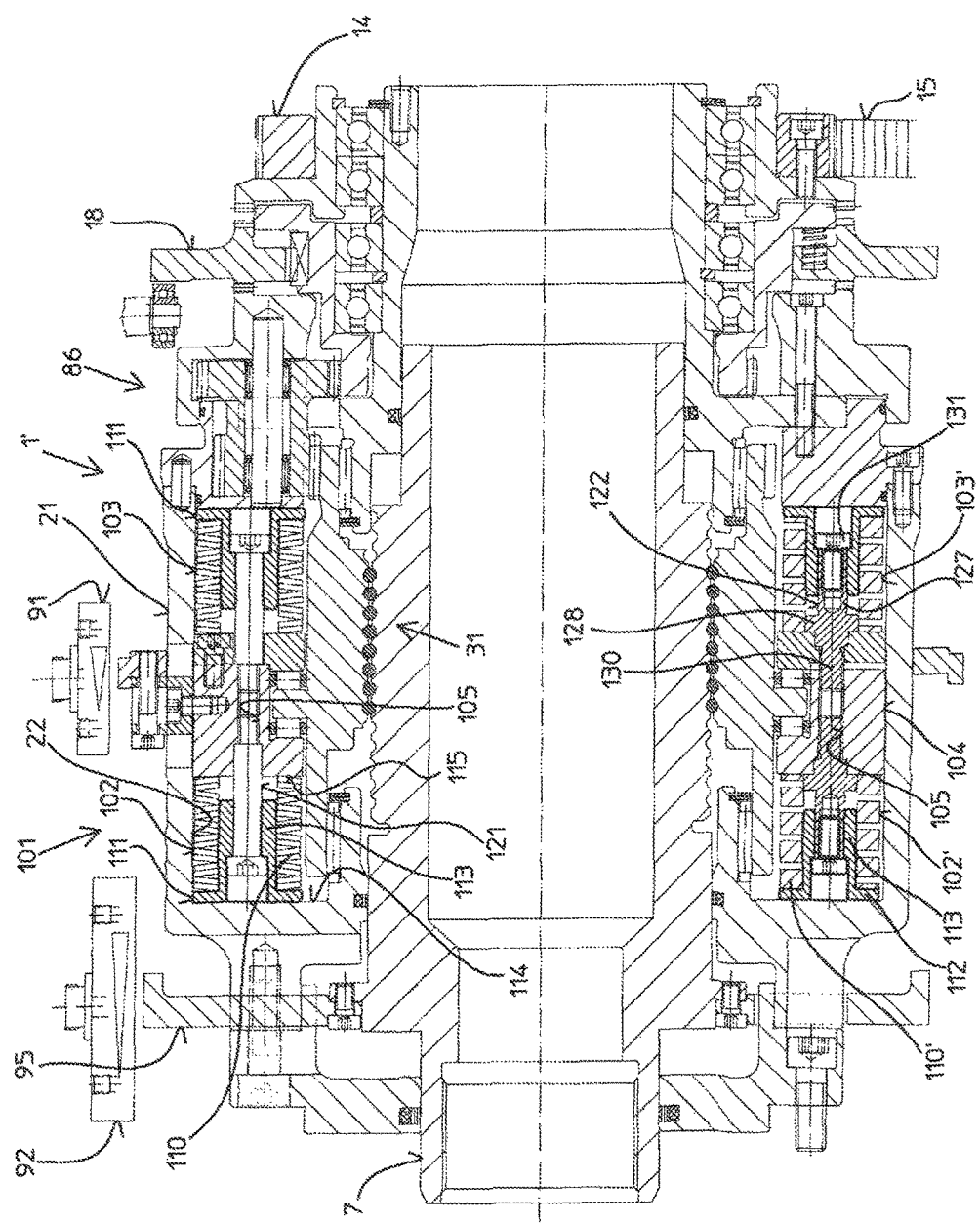
FIG. 5 shows the clamping device in accordance with FIG. 1, with spring packs as force accumulators arranged on both sides of the motion converter

Furthermore, as shown in FIG. 5, a signal ring 95 is attached to the draw rod 7 which interacts with a sensor 92 in order to determine the particular position of the draw rod 7 and thus of the clamping jaws 6 of the power-operated chuck 5.

The pressure piece 53, the spacer elements 57 with stop discs 61 and the springs 52 as well as the spacer 66 and the spacer pins 71 inserted in the pressure piece 53 can be preassembled as structural unit B and precisely adapted to the specified installation dimension. Structural unit B can thus be inserted into the housing 21 with an exact fit and without play, and consequently the springs 52 do not have any axial play even when they are in the slackened status.

Figure 6:
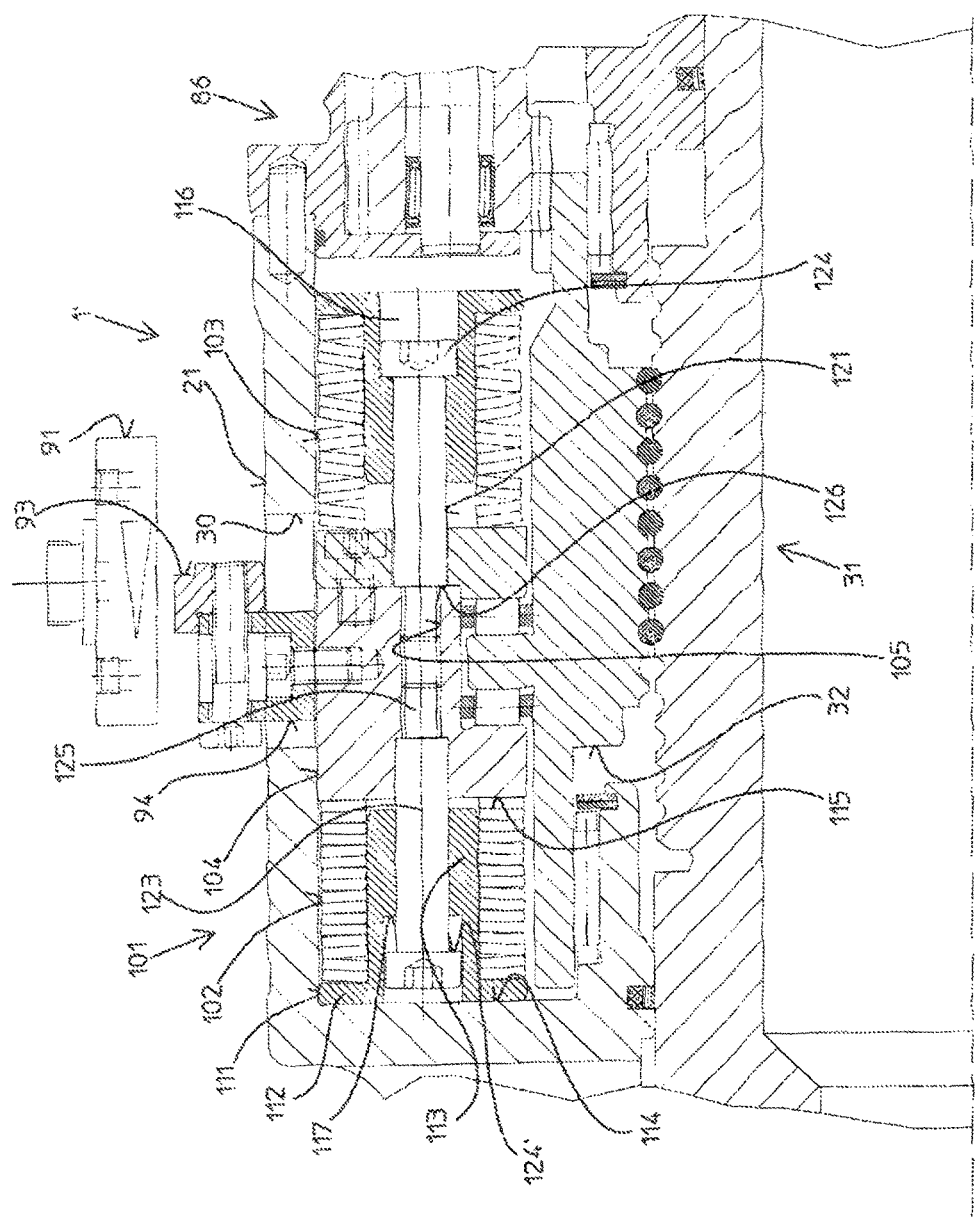
FIG. 6 shows a subsection from FIG. 5, in a magnified view.

In the sample embodiments of the clamping device 1' shown in FIGS. 5 and 6, the f force accumulator 101 consists of spring packs 102 and 103 or 102 and 103' arranged on both sides of a pressure piece 104, in which case these spring packs are also continuously pretensioned. The spring packs 102 or 102' are composed of cup springs 110 or coiled compression springs 110' in this case.

The stop discs 111 are each held on pin-like spacer elements 121 or 122 which are screwed into holes 105 worked into the pressure piece 104. The stop discs 111 have a T-shaped cross section and are guided in a moving arrangement with the webs 112 running in a radial direction along the inner wall 22 of the housing, whereas the tube-shaped pins 113 hold the spacer elements 121 or 122 and interact with stops 114 or 115 provided on the end wall 23 of the housing and the pressure piece 104.

The spacer elements 121 shown in the upper half of FIG. 5 and the magnified view shown in FIG. 6 are configured as offset pins 123 the head 124 of which engage in recesses 116 provided in the stop discs 111 and have their free ends configured as screw threads 125 screwed into the threaded holes 105 in the pressure piece 104. The spacer elements 121 are supported on the pressure piece 104 by means of a collar 126, and their heads 124 are in contact with a contact surface provided on the stop discs 111 in the slackened status of the spring packs 102, 103 as shown in the right half of FIG. 6, involving contact between a contact surface provided on the stop discs 111 and counter-surfaces 117 provided on the heads 124.

Each of the spacer elements 122 consists of an intermediate piece 127 provided with a collar 128 for supporting against the pressure piece 104, and screws 131 inserted in the intermediate pieces 127 by means of which the stop discs 111 are also transported during adjustment movements. Screw threads 130 are used for screwing the intermediate pieces 127 into holes 105 provided in the pressure piece 104.

The two spring packs 102 and 103 and 102' and 103' are supported on the stop discs 111 as well as the pressure piece 104 by means of spacer elements 121 or 122, in which case a selectable preload is always provided even in the non-loaded force accumulator—in FIG. 6 in the force accumulator 103—and the individual springs 102', 103' are thus securely held between the stop discs 111 and the pressure piece 104.

These embodiments mean that the springs 52'; 102', 103' of the force accumulators 51, 101 always have a selectable preload and, when in the slackened condition, are arranged without axial play between the stop discs 61 or 111 and the spacer 66 or pressure piece 104.

What is claimed is:

1. A clamping device, especially for machine tools, that are, for example, equipped with a power-operated chuck for holding a workpiece and the clamping jaws of which can be adjusted using the clamping device by means of an axially moveable draw rod as the actuating element, in which the clamping device, arranged in a housing, possesses an electric drive motor with a changeover function for triggering clamping movements, a motion converter for converting the adjustment movements of the rotor shaft of the drive motor into the axial adjustment movements of the draw rod required for actuating the clamping jaws as well as a force accumulator for maintaining the clamping force, which comprises several pre-stressed spring packs arranged around the circumference supported on an adjustment element of the motion converter that is configured as a hollow shaft and is provided with a projection projecting radially outward, characterised in that, for internal and external clamping of a workpiece, each of the spring packs of the force accumulator is inserted on one side of the adjustment element of the motion converter between the housing and a pressure piece, that several spacer elements are firmly connected to the pressure piece, each of which carries a stop disc and passes through the spring packs as well as a spacer, that the spacer elements and the spacer can be adjusted relative to one another and that the spacer interacts with spacer pins in an axial direction, in which case these spacer pins pass through the pressure piece and are supported against the wall of the housing opposite to the spring packs; and wherein the distance between the stop of the tube-shaped part of the stop discs and the spacer or the pressure piece is adjustable in the neutral position of the clamping device so that the maximum clamping force of the spring packs of the force accumulator can be adjusted.

2. The clamping device in accordance with claim 1, characterised in that the spacer elements are configured as offset pins which have one end screwed into the pressure piece and are in contact with this by means of a collar, and that the free ends of the spacer elements are configured as a screw head with a contact surface provided on the inside for the stop discs.

3. The clamping device in accordance with claim 1, characterised in that the spacers are configured with an angled or T-piece cross section, with their outer legs guided on the inner wall of the housing in such a way as to be movable, and with the springs of the force accumulator supported against the legs which hold the spacer elements.

4. The clamping device in accordance with claim 1, characterised in that the stop discs are configured in the form of a hollow shaft with a T-shaped cross section, the tube-shaped inner part of which accommodates a spacer element and is provided on the outside with a stop for the spacer element and on the inside with a contact surface which interacts with the spacer or the pressure piece.

5. The clamping device in accordance with claim 4, characterised in that the spacers are guided in a movable arrangement with their axially projecting leg along the inner wall of the housing.

6. The clamping device in accordance with claim 1, characterised in that the spacer pins are guided in the pressure piece in an adjustable manner, in which case the pressure piece is preferably configured in two parts, and the spacer pins are supported on the opposite side of the housing to the spring packs or the spacer pins are attached to the housing.

7. The clamping device in accordance with claim 1, characterised in that the spacer elements carrying the stop discs are screwed onto the pressure piece and equipped with a collar configured as a screw head on the outer end area, in which case the collar interacts with a contact surface provided or let into the stop discs.

8. The clamping device in accordance with claim 1, characterised in that the spring packs of the force accumulator are formed by cup springs or coiled compression springs arranged on the stop discs.

9. The clamping device in accordance with claim 1, characterised in that the pressure piece which is configured in a preferred embodiment in two pieces is supported on the shoulder of the adjustment element of the motion converter by means of anti-friction bearings.

10. The clamping device in accordance with claim 1, characterised in that a sensor is attached to the pressure piece and/or draw rod, for example in the form of a signal ring, in order to determine the clamping force or the adjustment movements of the draw rod.

11. A clamping device, especially for machine tools, that are for example equipped with a power-operated chuck for holding a workpiece and the clamping jaws of which can be adjusted using the clamping device by means of an axially moveable draw rod as the actuating element, in which the clamping device, arranged in a housing, possesses an electric drive motor with a changeover function for triggering clamping movements, a motion converter for converting the adjustment movements of the rotor shaft of the drive motor into the axial adjustment movements of the draw rod required for actuating the clamping jaws as well as a force accumulator for maintaining the clamping force, which comprises several pre-stressed spring packs supported on an adjustment element of the motion converter that is configured as a hollow shaft and is provided with a projection projecting radially outward, characterised in that when spring packs are arranged on both sides of the adjustment element of the motion converter, each of the spring packs is inserted between a pressure piece and stop discs in a mirror-image arrangement, that the stop discs are held by spacer elements attached to the pressure piece in such a way as to allow for limited movement and that stops are arranged on the stop discs on the housing and the pressure piece; and wherein the pressure piece, the spacer elements with stop discs and springs as well as the spacer and the spacer pins inserted in the pressure piece or the pressure piece and the spacer elements with stop discs and springs form a structural unit B that can be preassembled and clamped into the housing without play.

12. The clamping device in accordance with claim 11, characterised in that the spacer elements are each configured as an intermediate piece provided with a collar in contact with the pressure piece, and with one end screwed into the pressure piece, that a screw is inserted as the stop for the stop discs on the free end of the intermediate piece and that the collar and/or the connecting part of the spacer elements is/are configured as a guide for the spring packs and/or the stop discs.

13. A clamping device, especially for machine tools, that are, for example, equipped with a power-operated chuck for holding a workpiece and the clamping jaws of which can be adjusted using the clamping device by means of an axially moveable draw rod as the actuating element, in which the clamping device, arranged in a housing, possesses an electric drive motor with a changeover function for triggering clamping movements, a motion converter for converting the adjustment movements of the rotor shaft of the drive motor into the axial adjustment movements of the draw rod required for actuating the clamping jaws as well as a force accumulator for maintaining the clamping force, which comprises several pre-stressed spring packs arranged around the circumference supported on an adjustment element of the motion converter that is configured as a hollow shaft and is provided with a projection projecting radially outward, characterised in that, for internal and external clamping of a workpiece, each of the spring packs of the force accumulator is inserted on one side of the adjustment element of the motion converter between the housing and a pressure piece, wherein the pressure piece is supported on a shoulder formed on the adjustment element, with the effect that adjustment movements of the adjustment element are transmitted directly to the pressure piece, that several spacer elements are firmly connected to the pressure piece, each of which carries a stop disc and passes through the spring packs as well as a spacer, that the spacer elements and the spacer can be adjusted relative to one another and that the spacer interacts with spacer pins in an axial direction, in which case these spacer pins pass through the pressure piece and are supported against the wall of the housing opposite to the spring packs.

14. The clamping device in accordance with claim 13, characterised in that a sensor is attached to the pressure piece, for example in the form of a signal ring, in order to determine the spring force.

* * * * *